United States Patent
Steinmetz et al.

(10) Patent No.: US 11,287,783 B2
(45) Date of Patent: Mar. 29, 2022

(54) THERMAL MANAGEMENT SYSTEM AND METHOD FOR A VEHICLE

(71) Applicant: ENGINEERED MACHINED PRODUCTS, INC., Escanaba, MI (US)

(72) Inventors: Todd M. Steinmetz, Escanaba, MI (US); Michael P. Lasecki, Gladstone, MI (US)

(73) Assignee: Engineered Machined Products, Inc., Escanaba, MI (US)

(*) Notice: Subject to any disclaimer, the term of this patent is extended or adjusted under 35 U.S.C. 154(b) by 337 days.

(21) Appl. No.: 15/235,526

(22) Filed: Aug. 12, 2016

(65) Prior Publication Data
US 2018/0045100 A1   Feb. 15, 2018

(51) Int. Cl.
| | |
|---|---|
| *F01P 7/16* | (2006.01) |
| *G05B 17/00* | (2006.01) |
| *F02B 29/04* | (2006.01) |
| *F02D 41/00* | (2006.01) |
| *F02D 41/14* | (2006.01) |

(52) U.S. Cl.
CPC .............. *G05B 17/00* (2013.01); *F01P 7/16* (2013.01); *F02B 29/0456* (2013.01); *F02B 29/0493* (2013.01); *F01P 2023/08* (2013.01); *F01P 2050/22* (2013.01); *F01P 2060/045* (2013.01); *F02D 41/0007* (2013.01); *F02D 2041/1412* (2013.01); *Y02T 10/12* (2013.01)

(58) Field of Classification Search
CPC ............ F01P 9/06; F25B 49/02; F25B 49/022
See application file for complete search history.

(56) References Cited

U.S. PATENT DOCUMENTS

| | | | | |
|---|---|---|---|---|
| 2,521,654 A | * | 9/1950 | Sandler | F24H 3/0405 181/141 |
| 2,588,086 A | * | 3/1952 | Cole | A63J 5/10 454/119 |
| 2,588,756 A | * | 3/1952 | Oftebro | B60H 1/00257 392/347 |
| 2,646,496 A | * | 7/1953 | Takach | H04R 1/028 392/347 |

(Continued)

FOREIGN PATENT DOCUMENTS

WO    2015088423 A1    6/2015

*Primary Examiner* — Larry L Furdge
*Assistant Examiner* — Alexis K Cox
(74) *Attorney, Agent, or Firm* — Brooks Kushman P.C.

(57) ABSTRACT

A thermal management system and method for a vehicle includes a cooling system having a variable cooling capacity and which is connectable to a heat-producing system of the vehicle. A control system is configured to increase the cooling capacity of the cooling system to a first predetermined level in response to the at least one input indicating an increase in the future heat load of the heat-producing system when a temperature of the cooling system is at least a predetermined temperature and the cooling system is operating below the first predetermined level. The control system is also configured to inhibit increasing the cooling capacity of the cooling system to the first predetermined level in response to the at least one input indicating an increase in the future heat load of the heat-producing system when the temperature of the cooling system is less than the predetermined temperature.

21 Claims, 8 Drawing Sheets

(56) References Cited

U.S. PATENT DOCUMENTS

| | | | |
|---|---|---|---|
| 2,683,407 A * | 7/1954 | Takach | B60H 1/00257 |
| | | | 454/119 |
| 2,831,217 A * | 4/1958 | Lombardo | E04H 3/10 |
| | | | 52/6 |
| 5,415,134 A | 5/1995 | Stewart, Jr. | |
| 6,463,891 B2 | 10/2002 | Algrain et al. | |
| 6,591,174 B2 | 7/2003 | Chung et al. | |
| 7,267,085 B2 | 9/2007 | Joyce et al. | |
| 7,267,086 B2 | 9/2007 | Allen et al. | |
| 7,347,168 B2 | 3/2008 | Reckels et al. | |
| 7,406,835 B2 | 8/2008 | Allen et al. | |
| 7,424,868 B2 * | 9/2008 | Reckels | F01P 7/167 |
| | | | 123/41.1 |
| 7,454,896 B2 | 11/2008 | Chalgren et al. | |
| 7,484,378 B2 | 2/2009 | Allen et al. | |
| 7,533,635 B2 | 5/2009 | Bradley et al. | |
| 8,646,264 B2 | 2/2014 | Rampen et al. | |
| 10,492,246 B2 * | 11/2019 | Szabo | H04L 65/4061 |
| 10,496,329 B2 * | 12/2019 | Bhatt | G06F 9/4881 |
| 2005/0005620 A1 | 1/2005 | Oda et al. | |
| 2006/0191500 A1 | 8/2006 | Sugiyama et al. | |
| 2014/0312128 A1 * | 10/2014 | Matsuoka | G05B 15/02 |
| | | | 236/51 |
| 2016/0061093 A1 | 3/2016 | Johansson et al. | |

* cited by examiner

| LEVEL | 15 Fan rpm | 11 Fan rpm | Pump A rpm | Pump B rpm | Valve A % open | Valve B % open |
|---|---|---|---|---|---|---|
| 0 | 0 | 0 | 0 | 0 | 0 | 0 |
| 1 | 500 | 750 | 1000 | 1000 | 10 | 10 |
| 2 | 900 | 1200 | 1200 | 1325 | 20 | 20 |
| 3 | 1200 | 1600 | 1400 | 1650 | 30 | 30 |
| 4 | 1550 | 2025 | 1600 | 1975 | 40 | 40 |
| 5 | 1900 | 2450 | 1800 | 2300 | 50 | 50 |
| 6 | 2250 | 2875 | 2000 | 2625 | 60 | 60 |
| 7 | 2600 | 3300 | 2200 | 2950 | 70 | 70 |
| 8 | 2950 | 3725 | 2400 | 3275 | 80 | 80 |
| 9 | 3300 | 4150 | 2600 | 3600 | 90 | 90 |
| 10 | 3650 | 4575 | 2800 | 3950 | 100 | 100 |
| 11 | 4000 | 5000 | 3000 | 4275 | 100 | 100 |
| 12 | 4350 | 5500 | 3200 | 4600 | 100 | 100 |

Fig-8

| LEVEL | 15 Fan Scfm | 11 Fan Scfm | Pump A gpm | Pump B gpm | Valve A Rad flow | Valve B Rad Flow |
|---|---|---|---|---|---|---|
| 0 | 0 | 0 | 0 | 0 | 0 | 0 |
| 1 | 500 | 250 | 20 | 8 | 6 | 1 |
| 2 | 750 | 375 | 23 | 9 | 16 | 3 |
| 3 | 1000 | 500 | 28 | 11 | 28 | 6 |
| 4 | 1250 | 625 | 31 | 12 | 36 | 9 |
| 5 | 1500 | 750 | 37 | 14 | 44 | 12 |
| 6 | 1750 | 875 | 43 | 16 | 52 | 15 |
| 7 | 2000 | 1000 | 46 | 17 | 60 | 18 |
| 8 | 2250 | 1125 | 52 | 19 | 65 | 20 |
| 9 | 2500 | 1250 | 58 | 21 | 69 | 21 |
| 10 | 2750 | 1375 | 61 | 22 | 72 | 22 |
| 11 | 3000 | 1500 | 67 | 24 | | |
| 12 | 3250 | 1625 | 70 | 25 | | |

THERMAL MANAGEMENT SYSTEM AND METHOD FOR A VEHICLE

TECHNICAL FIELD

The present disclosure relates to a thermal management system and method for a vehicle.

BACKGROUND

Typical cooling systems for vehicles are reactive: they measure or otherwise determine one or more parameters indicative of a current thermal state of a system or systems within the vehicle, and then react to this information by adjusting cooling levels as needed or desired. One problem with reactive cooling systems is that there is always a lag between the time that a temperature change takes place and when the cooling level is adjusted to compensate and bring the temperature back into the desired range. Reactive cooling systems may allow the operating temperature of a heat-producing device, such as an engine, to fluctuate over a large range throughout any given period of operation. Wide temperature fluctuations in vehicle systems such as engines, transmissions, etc. are undesirable and may lead to inefficient operation among other undesirable characteristics. Therefore, it would be desirable to have a system and method for thermal management of a vehicle that does not solely rely on reaction to temperature changes that had already taken place, but rather, anticipates future temperature changes and adjusts the cooling system before a significant temperature change occurs, thereby maintaining a more constant operating temperature for the heat-producing device.

SUMMARY

Embodiments described herein may include a thermal management system for a vehicle that includes a cooling system having a variable cooling capacity and which is connectable to a heat-producing system of the vehicle. A control system includes at least one controller and may be operable to control the cooling capacity of the cooling system in response to at least one input indicative of a future heat load of the heat-producing system. The control system may be configured to increase the cooling capacity of the cooling system to a first predetermined level in response to the at least one input indicating an increase in the future heat load of the heat-producing system when a temperature of the cooling system is at least a predetermined temperature and the cooling system is operating below the first predetermined level. The control system may also be configured to inhibit increasing the cooling capacity of the cooling system to the first predetermined level in response to the at least one input indicating an increase in the future heat load of the heat-producing system when the temperature of the cooling system is less than the predetermined temperature.

Embodiments described herein may include a thermal management system for a vehicle that includes a cooling system having a variable cooling capacity and which is connectable to a heat-producing system of the vehicle. A control system includes at least one controller and may be configured to increase the cooling capacity of the cooling system to a first predetermined level based on a predicted increase in a future heat load of the heat-producing system when a temperature of the cooling system is at least a predetermined temperature and the cooling system is operating below the first predetermined level. The control system may be further configured to inhibit increasing the cooling capacity of the cooling system to the first predetermined level based on the predicted increase in the future heat load of the heat-producing system when the temperature of the cooling system is less than the predetermined temperature.

Embodiments described herein may include a method of thermal management for a vehicle having a heat-producing system and a cooling system operatively connected thereto. The method may include the step of increasing a cooling capacity of the cooling system to a first predetermined level in response to a predicted increase in a future heat load of the heat-producing system when a temperature of the cooling system is at least a predetermined temperature and the cooling system is operating below the first predetermined level. The method may also include the step of inhibiting an increase in the cooling capacity of the cooling system in response to the predicted increase in the future heat load of the heat-producing system when the temperature of the cooling system is less than the predetermined temperature.

BRIEF DESCRIPTION OF THE DRAWINGS

FIG. 8 is a chart illustrating how cooling devices are normalized to allow for a consistent level of operation independent of the capacity of the device; and FIG. 9 is a chart illustrating another way in which cooling devices are normalized to allow for a consistent level of operation independent of the capacity of the device.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
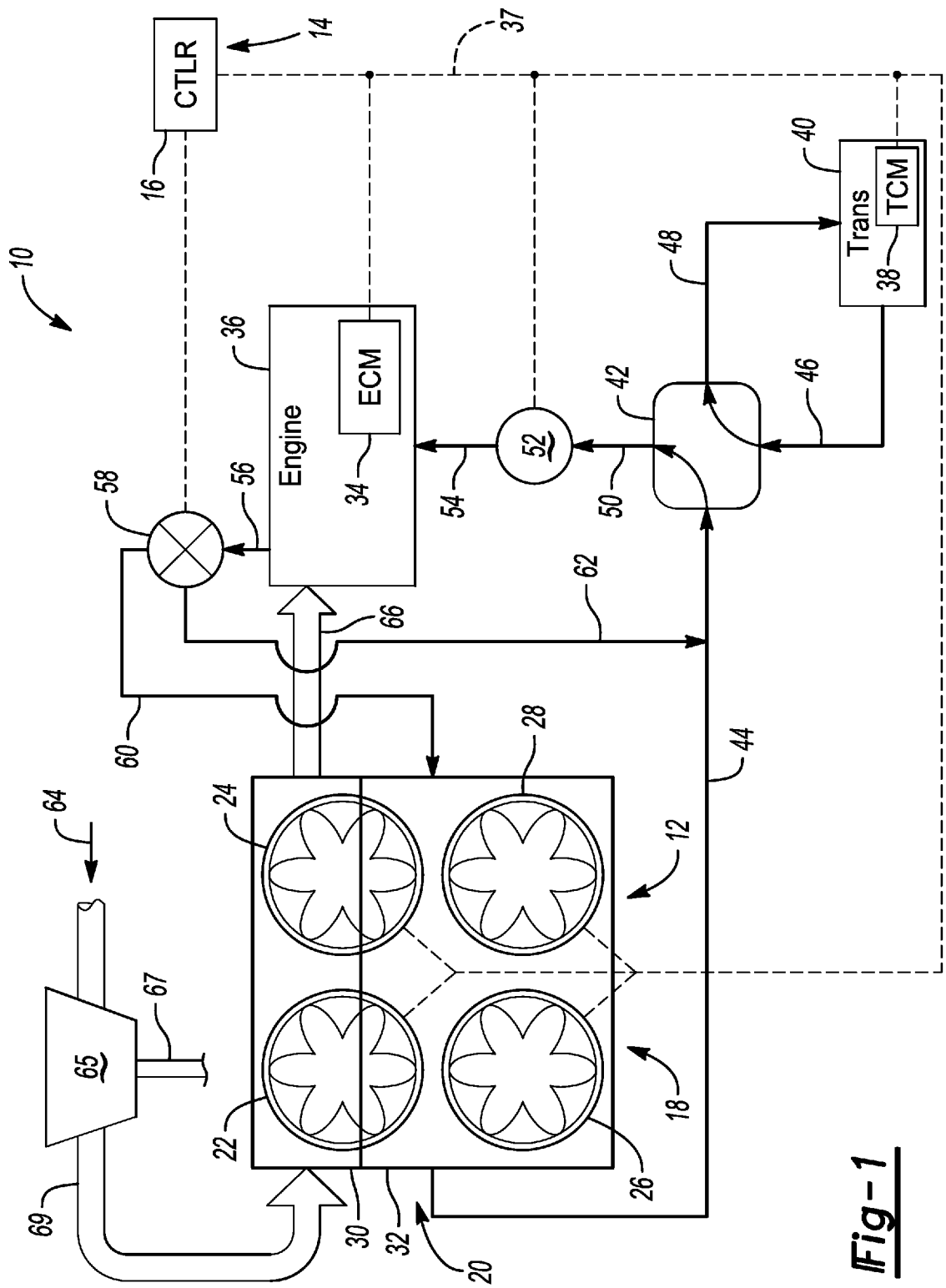
FIG. 1 is a schematic drawing of a thermal management system for a vehicle in accordance with embodiments described herein.

FIG. 1 shows a thermal management system 10 for a vehicle in accordance with embodiments described herein.

Although systems and methods described herein may be conveniently used with passenger and commercial automotive vehicles, it is contemplated that they may be used with other types of vehicles as well—e.g., locomotives, airliners, and marine vehicles just to name a few. The thermal management system 10 includes a cooling system 12 and a control system 14, which includes a cooling system controller 16. The cooling system 12 includes a heat exchanger and fan arrangement 18, which has a heat exchanger unit 20 and fans 22, 24, 26, 28. The heat exchanger unit 20 is made up of two separate heat exchange portions: a first heat exchange portion 30, which is part of a charge air cooling system, and a second heat exchange portion 32, which is configured to cool engine coolant—i.e., a radiator. In addition to the cooling system controller 16, the control system 14 includes an engine control module 34 (ECM), which is configured to control an engine 36 and communicate with other controllers on a communications link 37. The control system 14 also includes a transmission control module 38 (TCM), which is configured to control a transmission 40 and communicate with other controllers on the communications link 37.

The cooling system 12 also includes an auxiliary heat exchanger 42, which receives coolant through a coolant line 44 and transmission oil through a transmission oil line 46, and exchanges heat between the two mediums. The transmission oil is output from the heat exchanger 42 through another transmission oil line 48 where it returns to the transmission 40. The engine coolant is output from the heat exchanger 42 through another coolant line 50, which provides an intake for a pump 52. As shown in FIG. 1, the pump 52 is also connected to the communications link 37, so that it can be controlled and communicate with the control system 14. The coolant is output from the pump 52 through a coolant line 54 and into the engine 36—i.e., the coolant is pumped through a water jacket on the engine 36. The coolant is output from the engine 36 through a coolant line 56, which provides an intake for a bypass valve 58.

As shown in FIG. 1, the bypass valve 58 can be controlled to output some or all of the coolant through a coolant line 60, which leads directly into the radiator portion 32 of the heat exchanger 20. Alternatively, the bypass valve 58 can output some or all of the coolant through a bypass line 62, which bypasses the radiator 32. The bypass valve 58 can be controlled by the control system 14 based on any number of factors, including whether the engine 36 or transmission 40 is at a desired temperature. As shown in FIG. 1, the fans 22, 24 each extend over a portion of the charge air cooler 30 and a portion of the radiator 32. In contrast, the lower fans 26, 28 extend over the radiator portion 32 only. Each of the fans 22, 24, 26, 28 is connected to the communications link 37 and can be controlled by the control system 14. Because of the difference in heat exchanger coverage, it may be desirable to control the fans 22, 24 separately from the fans 26, 28. A control system and method for doing this is described, for example, in U.S. Patent Application Publication No. 2018/0043751, published on Feb. 15, 2018, which is incorporated by reference herein.

FIG. 1 also shows fresh air 64 entering a compressor 65, which may be a part of a turbo charger for the vehicle. The compressor 65 is driven by a shaft 67 connected to a turbine (not shown), which may, for example, be driven by exhaust gas leaving the engine 36. On the output side of the turbine 65, an air line 69 carries boosted, clean air to the charge air cooler 30. The air exits the charge air cooler 30 through an intake line 66, which provides intake air to an intake manifold (not shown), where it may be mixed with recirculated engine exhaust gas. In the embodiment shown in FIG. 1, the cooling system 12 includes the heat exchanger and fan arrangement 18, the auxiliary heat exchanger 42, the pump 52, the bypass valve 58, and the various coolant and air lines associated with the system. In other embodiments, a cooling system may include only one or more cooling fans that can be controlled by a control system, like the control system 14. A cooling system may include only fans that can be connected to other elements of a larger cooling system such as the one shown in FIG. 1. In other embodiments, a cooling system may include only a fan or fans that are connected to a heat exchanger, such as the heat exchanger 20—e.g., the heat exchanger and fan arrangement 18. A fan and heat exchanger arrangement such as this could then be connected to various other components of a larger cooling system, such as the cooling lines and other heat exchangers as shown in FIG. 1.

In general, the cooling system 12 is controlled by the control system 14, which is configured to control thermal management for a heat-producing system, such as a component or components of a vehicle. In the embodiment shown in FIG. 1, the heat-producing system includes two heat-producing devices—i.e., the engine 36 and the transmission 40. The transmission 40 may be particularly prone to generating large amounts of heat if it includes a retarder of the type used in large commercial vehicles, such as buses, to help reduce a speed of the vehicle without relying entirely on the friction brakes. In other embodiments, a heat-producing system may include a single heat-producing device, or more than two heat-producing devices. The cooling system 12 has a variable cooling capacity, which may be controlled, for example, through operation of various cooling devices within the system—e.g., the fans 22, 24, 26, 28, the pump 52, the valve 58, or some combination of these. One or more of these cooling devices may individually have variable cooling capacities—i.e., variable speed in the case of the fans 22, 24, 26, 28 and pump 52, and variable flow rates in the case of the valve 58.

Figure 2:
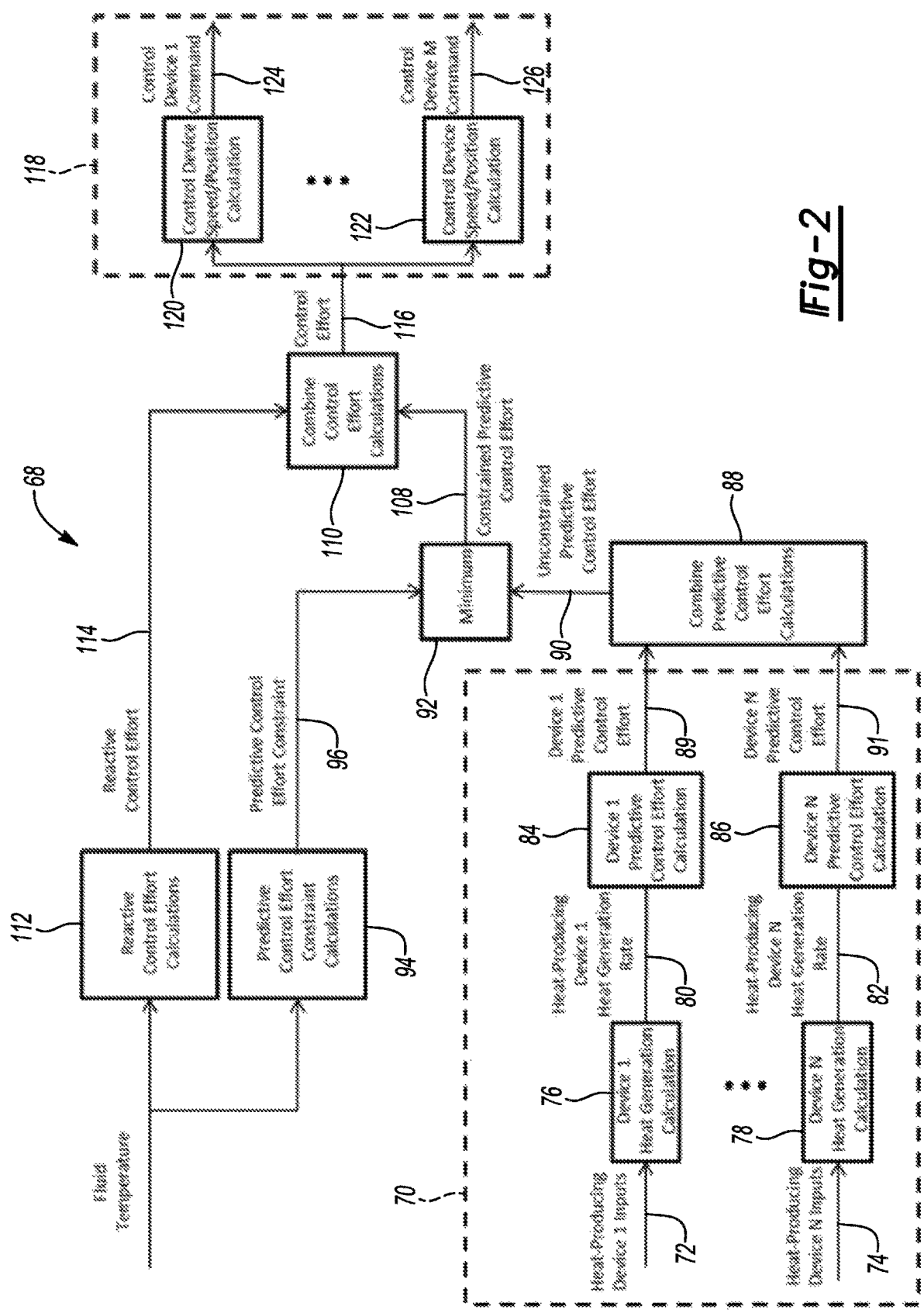
FIG. 2 is a flowchart illustrating a system and method of thermal management in accordance with embodiments described herein using separate predictive control effort calculations.

As described above, it may be desirable to control a thermal management system for a vehicle by using anticipated future temperature changes—i.e., a predictive control system—rather than exclusively reacting to temperature changes after they occur. Embodiments described herein provide this type of predictive control system, and the flowchart 68 shown in FIG. 2 provides an example. Using for reference the physical structure of the system 10 shown in FIG. 1, the flowchart 68 shows calculations 70 for a heat-producing system which includes a number of heat-producing devices—more specifically, 1-N devices. Again referring to the system 10 shown in FIG. 1, a first of the heat-producing devices may be represented by the engine 36, while the Nth heat-producing device—in this example the second heat-producing device—may be represented by the transmission 40.

Although various physical elements are described and labeled in conjunction with the flowchart 68, it is understood that the process illustrated by the various steps in the flowchart are part of the method covered by embodiments described herein, and may be executed, for example, by a control system such as the control system 14 illustrated in FIG. 1. One or more of the steps, including receiving inputs and generating outputs, may be performed by one or more of the controllers within the control system 14, which may include the cooling system controller 16, the ECM 34, the TCM 38, or any number of other hardware or software controllers communicating with each other through the communications link 37. Thus, the process illustrated in FIG. 2 may take place entirely within one or more controllers within a control system, such as the control system 14.

As shown in FIG. 2, a number of inputs 72 related to the first heat-producing device—i.e., the engine 36—are used as part of a predictive cooling system. Similarly, a number of inputs 74 related to the second heat-producing device—i.e., the transmission 40—are also used as part of the predictive cooling system. In general, the inputs 72, 74 are indicative of a future heat load of the heat-producing system, and more particularly, are indicative of a future heat load of the particular heat-producing device to which they relate. In other words, the inputs 72, 74 provide predicted increases or decreases in the future heat load of the heat-producing system, and in particular, the engine 36 and the transmission 40.

With regard to the engine 36, inputs 72 related to engine operation may include such parameters as the engine speed, a reference torque for the engine, and a percent torque for the engine. These parameters may include, for example, the commanded-level of engine speed, torque, or percent torque, which may be indicative of the near-term future heat load of the engine 36. Other types of inputs that would indicate a change in engine power, and therefore a change in future heat load, may also be used. For example, an accelerator pedal position could be used as an input to determine that the vehicle operator has recently "tipped-in" and the engine power is about to increase. Although the initial examples described herein relate to an increase in the future heat load of a heat-producing system, embodiments of the thermal management system described herein also contemplate inputs that are indicative of a decrease in the future heat load of a heat-producing system.

With regard to the transmission 40, inputs 74 related to the transmission operation may include a speed of the transmission output shaft, a reference torque for the transmission retarder, and a percent torque for the transmission retarder. Again, these inputs may be indicative of a future heat load of the transmission 40. At step 76 of the flowchart 68, a heat generation calculation takes place for the engine 36. Similarly, at step 78, a heat generation calculation takes place for the transmission 40. These heat generation calculations 76, 78 are based on the inputs 72, 74, and knowledge of the thermal properties of the various heat-producing devices of a heat-producing system. The "heat generation calculations" are related to the heat-load that may be expected of the heat-producing device, and in practice it may be more convenient to determine a heat generation rate for the various heat-producing devices.

A heat generation rate has units of power—e.g., kilowatts (kW), but is not the same as the mechanical power output by the engine 36 or the transmission 40—although an increase in mechanical power output is often associated with an increase in heat generation rate. The heat generation rate may be calculated from the inputs, for example, through an equation or through a lookup table that can be preprogrammed into the control system 14. More specifically, changes in the heat-load of a heat-producing device—which may be indicated at least in part by changes in temperature—can be empirically determined and correlated with changes in speed, torque and other operating parameters of the heat-producing device. These relationships can then be made available to a control system, such as the control system 14, to use in determining heat generation rates.

As shown in FIG. 2, the outputs from steps 76, 78 are heat generation rates 80, 82 for each of the heat-producing devices. For a cooling system, such as the cooling system 12 shown in FIG. 1, it may be possible to determine a certain cooling level capacity that is required to maintain the desired temperature of any particular heat-producing device. This is performed at step 84 for the engine 36, and at step 86 for the transmission 40. The desired cooling level capacity for any given heat generation rate may be determined empirically and preprogrammed into a control system, such as the control system 14. For example, one or more equations, lookup tables or curves may be used to relate the desired cooling capacity to the heat generation rate.

Figure 3:
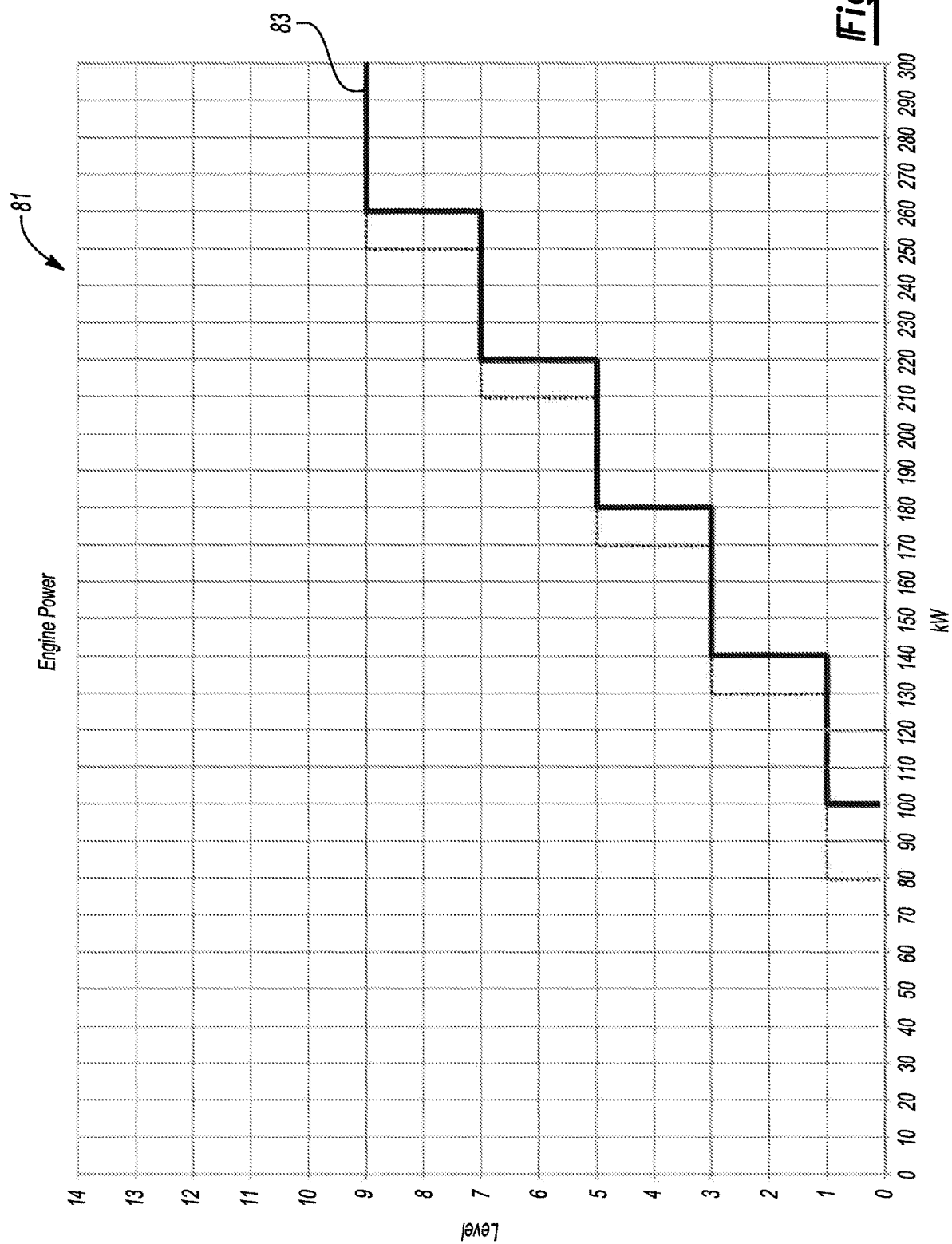
FIG. 3 is a graph illustrating a relationship between a cooling level for a cooling fan or fans and heat dissipation from an engine.

Turning to FIG. 3, a graph 81 illustrates a relationship between cooling levels on the y-axis and heat generation rates for the engine 36 shown along the x-axis. In this embodiment, the levels shown along the y-axis are normalized fan speeds that allow for different sized fans to be operated using a common parameter indicative of their cooling capacity output. This is explained in more detail below in conjunction with FIGS. 8 and 9. Although the graph 81 is labeled "Engine Power", it is understood that the "power" term is not a mechanical power of the engine, although it may be related. Rather, the power is a power value related to the heat load of the engine—i.e., it is the heat generation rate, which has units of power as indicated by the values shown along the x-axis. The graph 81 illustrates the relationship between heat generation and cooling level by a curve 83, although it is understood that this relationship can be represented in other ways, for example, through an equation or a lookup table just to name two.

Figure 4:
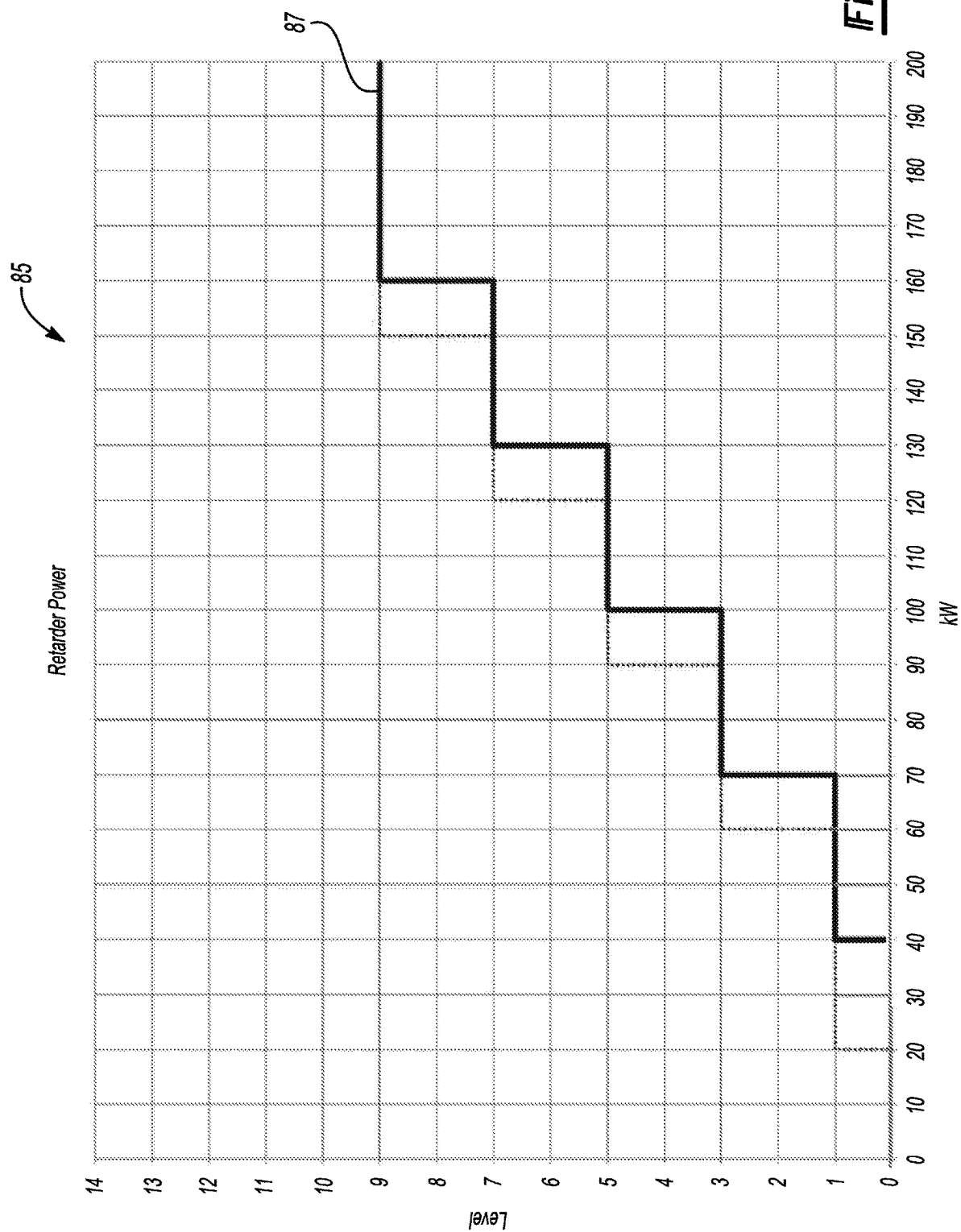
FIG. 4 is a graph illustrating a relationship between a cooling level for a cooling fan or fans and heat dissipation from a transmission retarder.

As shown in FIG. 3, if it is desired to dissipate heat for the engine 36 while it has a heat generation rate at or above 100 kW but below 140 kW, the fans can be operated at a level 1. Near the other end of the graph 81, it is shown that if the engine 36 is operating with a heat generation rate at or above 220 kW but below 260 kW, the fans may be operated at level 7 to dissipate the heat necessary to maintain the engine 36 at its desired temperature. FIG. 4 shows a similar graph 85, illustrating the relationship between the level of fan operation and the heat generation rate of a retarder in the transmission 40. Similar to the graph 81, the graph 85 illustrates the relationship between heat generation rate and cooling level in the form of a curve 87 although other forms of defining the relationship may be used. The unlabeled dotted lines in each of the two graphs 81, 85 represent a hysteresis for controlling the fans downward from a higher engine or transmission heat generation rate. Each of the graphs 81, 85 show levels for operating the fans depending on the power of the engine 36 or the retarder in the transmission 40; however, it is understood that different—for example, more complex—schemes of fan operation can be implemented where the cooling system includes multiple fans such as shown in the cooling system 12 in FIG. 1, and these fans may be operated at different levels.

Returning to FIG. 2, the outputs from steps 84, 86 are "predictive control efforts" 89, 91 for the respective devices. More specifically, the predictive control efforts 89, 91 are the cooling levels determined from the graphs 81, 85. The predictive control efforts 89, 91 are combined at step 88 such that an unconstrained predictive control effort 90 is output into a first comparator 92. Because the total heat generation rate expected for both of the engine 36 and the transmission 40 will contribute to the overall heat load of the heat-producing system, the outputs 89, 91 may be combined at step 88 in a number of ways. For example, if both of the outputs 89, 91 indicate that a future heat load of the heat-producing system will increase, it may indicate a need to increase the fan speed to some level above what each of the graphs 81, 85 indicate separately. Similarly, if both of the outputs 89, 91 indicate that a future heat load of the heat-producing system will decrease, a need to decrease the fan speed may be indicated. If the outputs 89, 91 indicate future heat loads going in opposite directions for each of the two heat-producing devices, combining them at step 88 may lead to an indication that the fan speed should be increased, or an indication that the fan speed should be decreased, depending upon which heat-producing system will change its heat generation rate the most. The output 90 from step 88 may not be determinative of how the control system 14 will proceed; rather, other factors may be considered and arbitrated, as described in more detail below and illustrated in FIG. 2.

Although embodiments described herein can increase the cooling capacity of a cooling system in response to inputs, such as the inputs 72, 74, it may not be desirable to implement such an increase if a current temperature of the cooling system is below a predetermined temperature. As used herein, "a temperature of the cooling system" can be measured, determined, or estimated in any of a number of ways and used effectively with the systems and methods described. For example, the engine coolant temperature may be used as a parameter that is indicative of a temperature of the engine 36, and with the shared heat exchanger 42 shown in FIG. 1, may also be indicative of a temperature of the transmission 40. Similarly, a temperature of the transmission oil inside a sump within the transmission 40, or a temperature of the output fluid from the transmission retarder may also be used to determine a temperature of the cooling system. With the system illustrated in FIG. 1, which includes the charge air cooler 30, a temperature of the intake manifold air—shown as air intake 66 in FIG. 1—may also be used.

Figure 5:
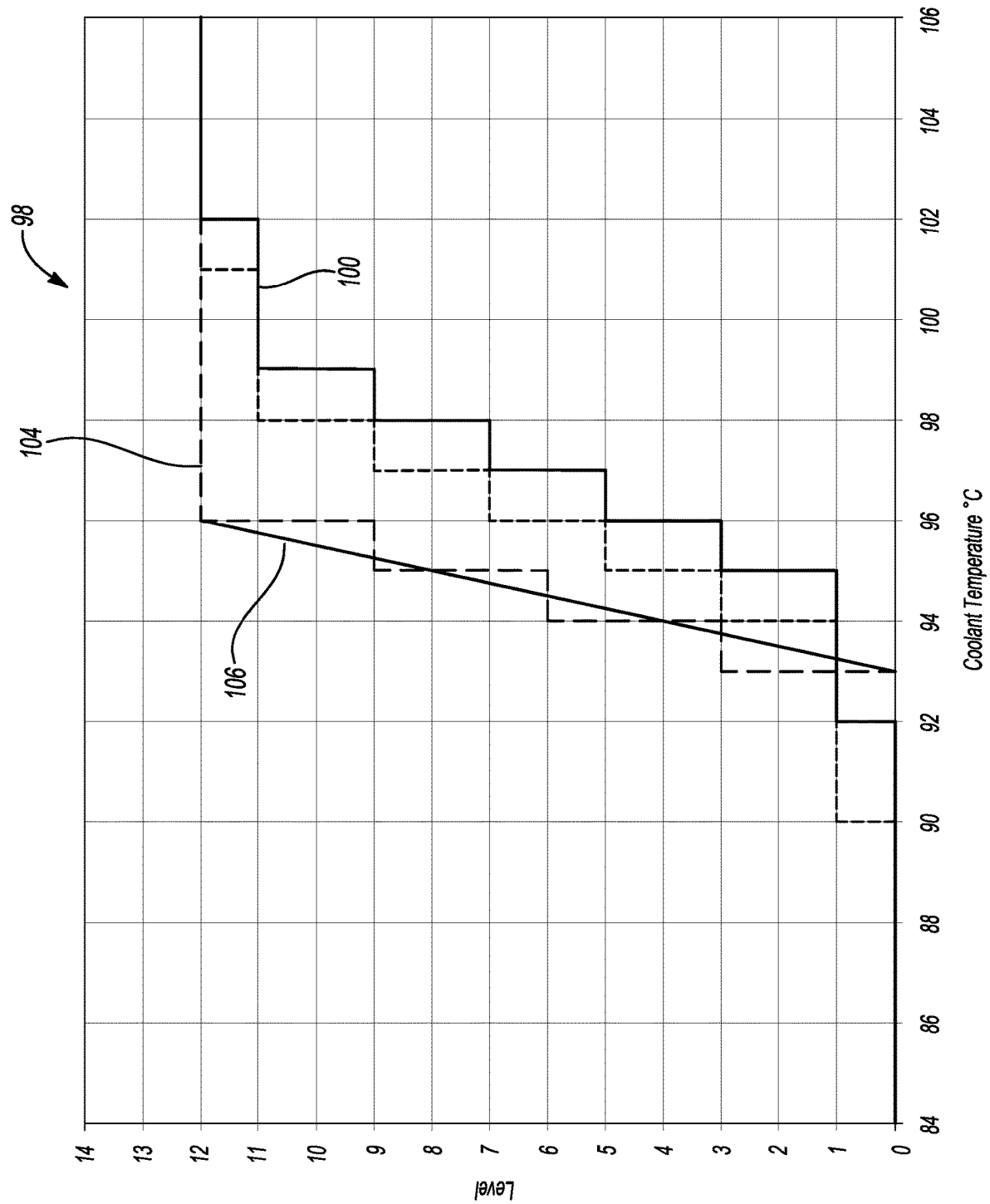
FIG. 5 is a graph illustrating a relationship between a cooling level for a cooling fan or fans and heat dissipation from a heat-producing system.

In the flowchart 68 shown in FIG. 2, a fluid temperature is used as part of a predictive heat exchange rate constraint calculation shown in step 94. This calculation is output as a predictive control effort constraint 96 and input into the comparator 92 for the first of two arbitrations used in this embodiment of the control system. FIG. 5 shows a graph 98 illustrating a number of straight or stepped lines related to the thermal management system and methods described herein. A first stepped line 100 illustrates a relationship between a level of cooling device operation shown on the y-axis and a temperature of a cooling system shown along the x-axis. In the embodiment shown in FIG. 5, the y-axis represents a level of operation for cooling fans, such as the fans 22, 24, 26, 28 shown in FIG. 1, and the x-axis represents a temperature of the engine coolant, which may be measured at some convenient point in the system. The line 100 illustrates one possible method of operating fans as part of a reactive thermal management system.

The stepped dashed line 104 and the straight solid line 106 represent constraints that may be applied to a predictive cooling system, such as described herein. Similar to the graphs 81, 85 shown in FIGS. 3 and 4, respectively, the dotted lines in the graph 98 represent a hysteresis for controlling the fans as the temperature of the cooling system decreases. The stepped line 104 may be conveniently used in a system whereby temperature is measured in discrete increments of a degree or several degrees. Conversely, the straight line 106 may be conveniently used in other systems where the temperature may be measured in such small increments as to be considered nearly continuous. Using the information provided in FIGS. 2-5, an example of the predictive cooling system and method is now provided.

As described above in conjunction with FIG. 2, an unconstrained predictive control effort is input into a comparator 92. The unconstrained predictive control effort 90 may be in the form of a level of operation for the fans 22, 24, 26, 28, as determined from the inputs and the graphs 81, 85, and appropriately combined at step 88, as described in detail above. For purposes of this example, it will be assumed that all of the fans 22, 24, 26, 28 that are operating will be operating at the same level. If, for example, the combined predictive control effort determined at step 88 indicates that a desired level of operation for the fans 22, 24, 26, 28 is level 5, which for this example will be referred to as a first predetermined level, the thermal management system will first determine if the cooling system is operating at a temperature that is at least a predetermined temperature. Turning to FIG. 5, the constraint line 104 shows that the fans should not be operated at level 5 until the temperature is at least the predetermined temperature of 94 C. The constraint line 106 provides a similar result, although the predetermined temperature using this line is approximately 94.4 C. Depending on which constraint line and which predetermined temperature is used, a limiting value of fan speed level will be input into the comparator 92 shown in FIG. 2.

If the unconstrained predictive control effort 90 indicates that the fans should be operated at level 5, and the cooling system 12 is determined to be at least the predetermined temperature, then the cooling capacity of the cooling system 12 will be increased by increasing the fan speed if the fan speed is not already at level 5. Because the comparator 92 takes the minimum of the input values 90, 96, if the constraint input at 96 indicates that the fan speed should be less than level 5—e.g., if the temperature of the cooling system 12 is at 93.5 C—the fans will not be allowed to operate any higher than level 3 if the constraint line 104 is used, or level 2 if the constraint line 106 is used. In general, the control system 14 inhibits increasing the cooling capacity of the cooling system 12 to the first predetermined level when it is determined that the temperature of the cooling system is less than the predetermined temperature: this is true even if there are inputs indicating an increase in the future heat load of the heat-producing system. This helps to prevent over-cooling.

If the temperature of the cooling system is less than the predetermined temperature, the control system 14 may in some cases increase the fan speed, but not up to the first predetermined level. For example, if the fans are operating below level 3, and the predictive control indicates a desire to increase the fan speed to level 5, but the temperature of the cooling system is below the predetermined temperature, in this example 93.5 C, the control system 14 will increase the fan speed to a second predetermined level, in this case level 3. The control system 14 will further allow the fan speed to increase to level 5 when the predetermined temperature is reached. In situations where a continuous constraint line is used, such as the constraint line 106, the control system 14 will increase the cooling capacity of the cooling system 12 by increasing the fan speed from the second predetermined level 3 toward the first predetermined level 5 when the temperature of the cooling system increases toward the predetermined temperature. In other words, the fan speed will be allowed to increase incrementally as the temperature increases, rather than operating in the stepwise manner shown by the constraint line 104.

Returning to FIG. 2, it is shown that the arbitration that takes place of the comparator 92 is not the only arbitration employed by the thermal management system. For example, the output 108 from the comparator 92 is a constrained predictive control effort, and is input into another comparator 110, which also performs arbitration. The fluid temperature previously used for the predictive heat exchange rate constraint calculation at 94 is also used for a more conventional reactive temperature regulation shown at step 112. This fluid temperature provides an indication of the cooling capacity needed based on an input indicative of the current heat load of the heat-producing system. Based on this fluid temperature—which, as described above, may be the engine coolant temperature—a reactive control effort 114 is determined and input into the comparator 110.

In general, the comparator 110 arbitrates a cooling capacity level based on inputs indicative of the future heat load—the input 108—and a cooling capacity level based on inputs indicative of the current heat load of the heat-producing system—the input 114. The comparator 110 may arbitrate the inputs according to any method effective to produce the desired outcome—e.g., it may choose a maximum value of the inputs, it may modify one of the inputs based on the other input, or it may choose to combine the inputs in some other way. The result is a control effort 116, which may be in the form of a level of operation for one or more of the cooling devices. The control effort 116 is then used to control various cooling devices as shown by block 118, which may include the fans 22, 24, 26, 28, the pump 52, the valve 58, or other cooling devices within different cooling systems. More specifically, the desired speed or position for controlling a first device is calculated at step 120, while the desired speed or position for controlling the Mth device is calculated at step 122, and in each case the control system 14 send signals 124, 126 to effect the appropriate control.

Although the example above described how the control system 14 was configured to increase the cooling capacity of the cooling system 12 in response to inputs indicating an increase in the future heat load of the heat-producing system, embodiments also may be configured such that the control system 14 is operable to decrease the cooling capacity of the cooling system 12 based at least in part on at least one input indicative of the future heat load of the heat-producing system indicating a decrease in the future heat load of the heat-producing system. Thus, for example, the inputs 72, 74 shown in FIG. 2 may indicate that an output torque of the engine 36 is expected to decrease, or that retarder use in the transmission 40 will soon be complete.

Another example of a situation that might indicate a decrease in future heat loads is operation of a defroster and passenger compartment heater, which may take energy from the system. As discussed above, it may be desirable to reduce the cooling capacity of the cooling system 12 based on the predicted decrease in overall heat load. In this situation, the control system 14 may reduce a fan speed or fluid flow so that the engine 36 and transmission 40 are not over-cooled. Similar to how the system is controlled in the presence of a predicted increase in future heat loads, it may be desirable to provide some arbitration, such as described above, in the presence of a predicted decrease in future heat loads. For example, if a conventional reactive cooling system indicates a need for a higher level of cooling, the control system 14 may not implement the predictive cooling system recommendation to reduce the capacity of the cooling system 12.

Figure 6:
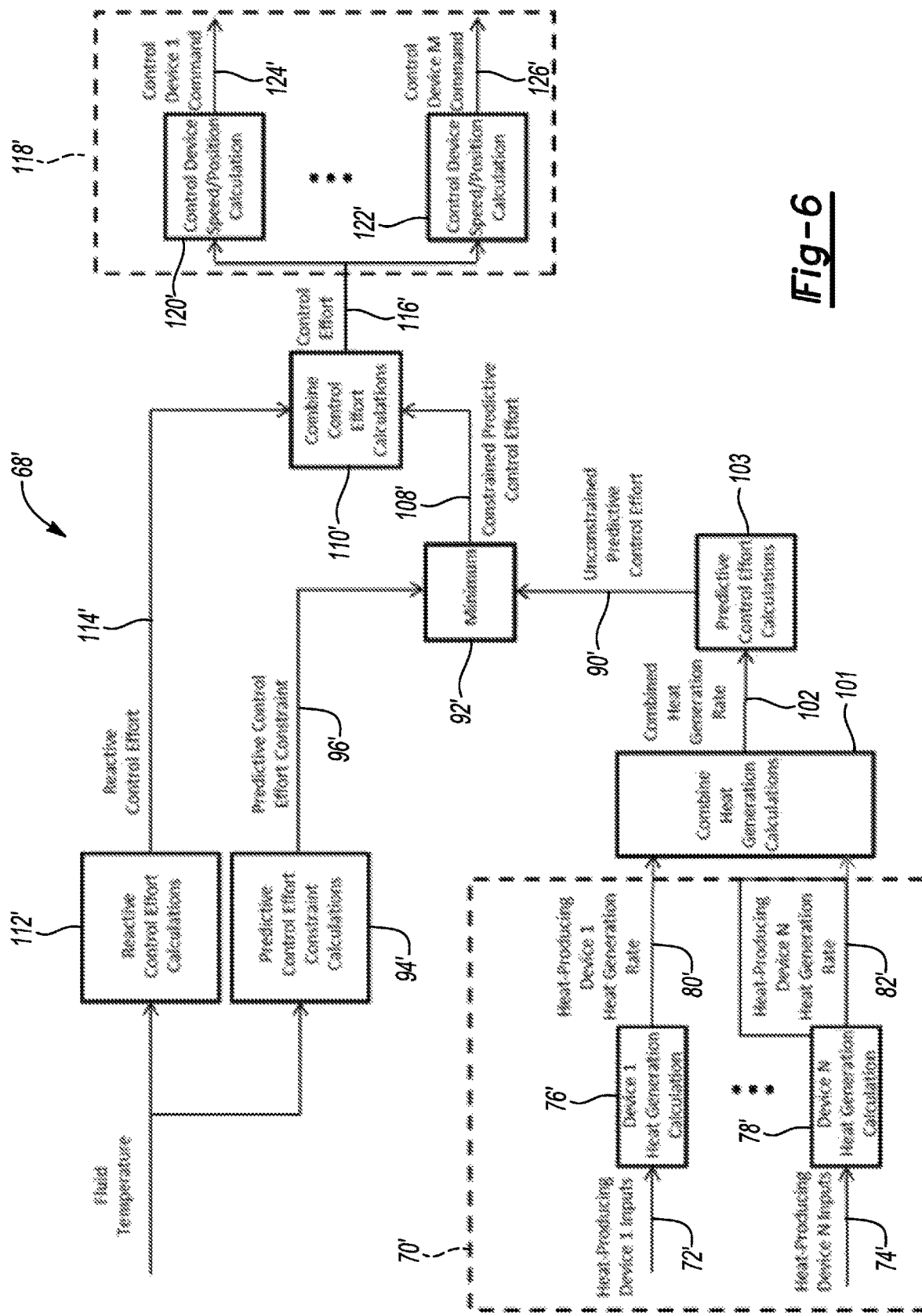
FIG. 6 is a flowchart illustrating a system and method of thermal management in accordance with embodiments described herein using combined predictive control effort calculations for more than one heat-producing device.

Turning to FIG. 6, another flowchart 68' is shown, illustrating an alternative to the embodiment described above and illustrated in FIG. 2. In the flowchart 68', steps that parallel steps of the embodiment shown in FIG. 2 are labeled with the prime (') symbol, and unless they are described otherwise, are assumed to follow the same description provided above. The primary difference between the system and method illustrated in FIG. 2 and the system and method illustrated in FIG. 6 is how the heat generation rates for the various heat-producing devices are combined. In the embodiment illustrated in FIG. 2, the heat generation rates 80, 82 were separately calculated to provide individual control efforts 89, 91. These control efforts were then combined at step 88. In contrast, the embodiment illustrated in FIG. 6 combines the heat generation rates 80', 82' for the individual heat-producing devices before the control efforts are calculated.

As shown in FIG. 6, the heat generation rates 80', 82' are combined at step 101 to yield a combined heat generation rate 102. Similar to the combination step 88 described above, the heat generation rates 80', 82' may be combined in a number of different ways, depending on what their values are. For example, if both of the heat generation rates indicate that the heat load of the two devices is increasing, the combined heat generation calculation may result in a combined heat generation rate that is greater than either of the two components individually, although it may not be as high as a sum of the two components. Similarly, if both heat generation rates indicate that the heat load of the two devices is decreasing, or that the heat loads of the two devices are moving in different directions, the combined heat generation calculation may result in a combined heat generation rate that is some mathematical combination of the two heat generation rates 80', 82'. The specific ways in which the heat generation rates 80', 82' are combined can be preprogrammed into a control system, such as the control system 14.

Figure 7:
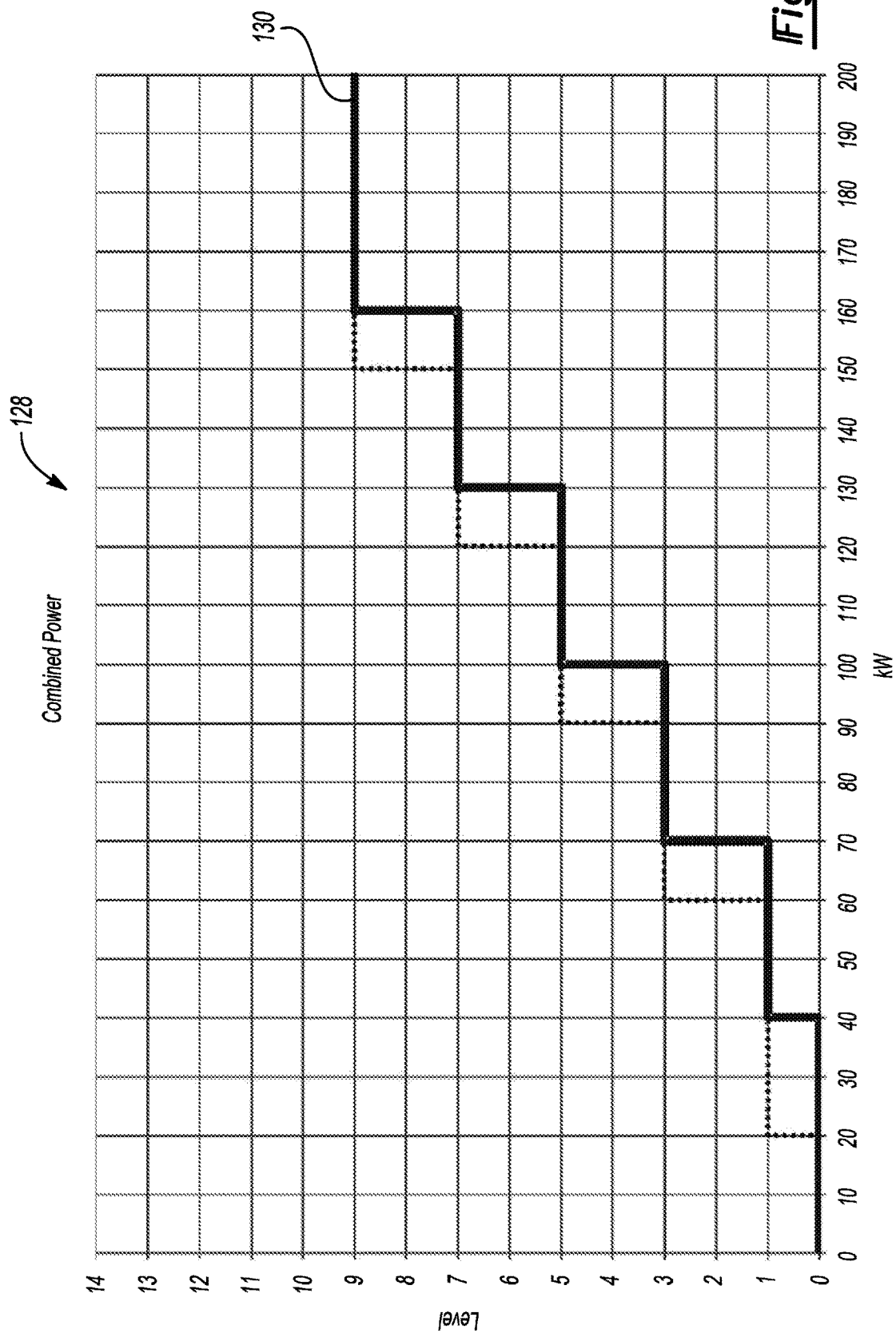
FIG. 7 is a graph illustrating a relationship between a cooling level for a cooling fan or fans and heat dissipation from a combination of heat-producing devices.

Once the combined heat generation rate 102 is determined, predictive control effort calculations take place at step 103. In the embodiment illustrated in FIG. 2, a control effort calculation occurs for each device, and the relationships between heat generation rate and cooling level for each device are illustrated in FIGS. 3 and 4. For the embodiment illustrated in FIG. 6, the predictive control effort calculations 103 are based on a combined power of all of the heat-producing devices—i.e., a combined heat generation rate. A relationship between the combined heat generation rate and the desired cooling level is illustrated in a graph 128 shown in FIG. 7.

Similar to the graphs 81, 85, the graph 128 has a heat generation rate or "combined power" along the x-axis, and a cooling level illustrated along the y-axis. The relationship between the heat generation rate and the cooling level is defined by a curve 130, although different forms of defining the relationship could be used. In this embodiment, the curve 130 is used at step 103 in the predictive control effort calculations. Similar to the output from step 88 shown in FIG. 2, the output from step 103 is an unconstrained predictive control effort 90'. The rest of the system and method illustrated in FIG. 6, follows the same steps as shown and described above with regard to FIG. 2.

Turning to FIG. 8, a chart 132 is shown, which illustrates how various cooling devices—in this case fans, pumps, and valves—can have their output normalized so that each can operate at the same level for purposes of a control system and method such as described above. This may be very desirable in that it simplifies the control calculations considerably if a control system, such as the control system 14, can operate all of the cooling devices at a particular level, rather than having to undergo calculations each time a different cooling device is controlled because that cooling device has a different cooling capacity than another cooling device in the same system. In general, a control system, such as the control system 14 may be preprogrammed with a number of cooling device levels that define a respective cooling capacity for each of the cooling devices that is independent of a maximum capacity of the respective cooling device. In the chart 128, cooling fans of 11 inches diameter and 15 inches diameter are compared, as are two pumps of different capacities, and two valves of different capacities.

The starting and ending points of the chart may be somewhat arbitrary, but they may be grounded in practical considerations for actual use of the cooling device. For example, level 1 may be chosen to be a fan or pump motor speed that is the minimum possible speed for that particular device in order to achieve a stable commutation. At the other end of the spectrum, level 12 may be chosen to be the maximum amount of current that can be supplied to the fan or pump motor. With regard to the valves, level 1 may be the minimum percent opening that is achievable given the control constraints associated with the valve, while level 12 may be the maximum the valve can be opened, which may often be 100%. The other levels may be equal incremental divisions between level 1 and level 12, or other convenient divisions may be used. As shown in the chart 132, the maximum capacity for the valves is set at a level below 12, in this embodiment the valves are at maximum capacity at level 10.

As shown in the chart 132, at each particular level the 11 inch fan operates at a higher speed than the 15 inch fan in order to output the same amount of cooling capacity. In the case of a fan, this may be a measurement of volumetric flow rate. Similarly, the smaller pump "Pump B" operates at a higher speed than Pump A for most of the operating levels. In contrast, the two valves are of the same size and capacity, and therefore have the same percent open values for each different level. They are included in the chart 132, however, to show how they can be related to the other cooling devices so that their operation can be normalized to a particular level number and easily used by a control system, such as the control system 14.

FIG. 9 shows another chart 134, which also provides normalized operating levels for various fans pumps and valves. In the chart 134, different parameters are used for normalization as compared to the same devices in the chart 132. Specifically, the fans are now normalized based on a volumetric flow rate expressed as standard cubic feet per minute (scfm). Similarly, the pumps are normalized based on a volumetric flow rate expressed in gallons per minute (gpm), and the valves are normalized based on a volumetric flow rate through the radiator, which could also be expressed in gpm. As noted above, normalizing operation of various cooling devices may provide advantages in the implementation of thermal management systems and methods such as described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A thermal management system for a vehicle, comprising:
a cooling system including at least one of a fan or a pump, or at least one valve and connectable to a heat-producing system of the vehicle, the cooling system having a variable cooling capacity effected by varying the speed of at least one of the at least one fan or pump, or by varying the flow rate of the at least one valve; and
a control system including at least one controller and operable to control the cooling capacity of the cooling system in response to at least one input indicative of a heat generation rate of the heat-producing system, the control system being configured to increase the cooling capacity of the cooling system to a first predetermined level in response to the heat generation rate indicating an increase in the future heat load of the heat-producing system when a temperature of the cooling system is at least a predetermined temperature, and to inhibit increasing the cooling capacity of the cooling system to the first predetermined level in response to the heat generation rate indicating an increase in the future heat load of the heat-producing system when the temperature of the cooling system is less than the predetermined temperature.

2. The thermal management system of claim 1, wherein the control system being configured to inhibit increasing the cooling capacity of the cooling system to the first predetermined level in response to the heat generation rate indicating an increase in the future heat load of the heat-producing system when the temperature of the cooling system is less than the predetermined temperature includes the control system increasing the cooling capacity of the cooling system to a second predetermined level below the first predetermined level when the cooling system is operating below the second predetermined level.

3. The thermal management system of claim 2, wherein the control system is further configured to increase the cooling capacity of the cooling system from the second predetermined level to the first predetermined level when the temperature of the cooling system increases to the predetermined temperature and the cooling system is operating below the first predetermined level.

4. The thermal management system of claim 2, wherein the control system is further configured to increase the cooling capacity of the cooling system from the second predetermined level toward the first predetermined level when the temperature of the cooling system increases toward the predetermined temperature.

5. The thermal management system of claim 1, wherein the heat-producing system includes a plurality of heat-producing devices, and the at least one input includes at least one input indicative of a heat generation rate for each of the heat-producing devices.

6. The thermal management system of claim 1, wherein the control system is further operable to control the cooling capacity of the cooling system in response to at least one input indicative of a current heat load of the heat-producing system, the control system being further configured to control the capacity of the cooling system based on an arbitration of a cooling capacity level based on the heat generation rate indicative of the future heat load of the heat-producing system and a cooling capacity level based on the at least one input indicative of the current heat load of the heat-producing system.

7. The thermal management system of claim 6, wherein the at least one input indicative of a current heat load of the heat-producing system includes a temperature of a coolant of the cooling system.

8. The thermal management system of claim 6, wherein the control system is further configured to decrease the cooling capacity of the cooling system based at least in part on the heat generation rate indicative of the future heat load of the heat-producing system indicating a decrease in the future heat load of the heat-producing system.

9. The thermal management system of claim 8, wherein the control system is further configured to decrease the cooling capacity of the cooling system when a result of the arbitration is to control the capacity of the cooling system based on the heat generation rate indicative of the future heat load of the heat-producing system and the heat generation rate indicative of the future heat load of the heat-producing system indicates a decrease in the future heat load of the heat-producing system.

10. The thermal management system of claim 1, wherein the cooling system includes a plurality of cooling devices, including at least one of the at least one fan or pump, or the at least one valve, operable to effect a change in the cooling capacity of the cooling system, the control system being preprogrammed with a plurality of cooling device levels defining a respective cooling capacity of each of the cooling devices independent of a maximum capacity of the respective cooling device.

11. The thermal management system of claim 1, wherein the heat-producing system includes a first heat-producing device and a second heat-producing device, the control system being further configured to control the cooling capacity of the cooling system in response to a heat generation rate of the first heat-producing device and in response to a heat generation rate of the second heat-producing device, and wherein the control system is further operable to control the cooling capacity of the cooling system in response to at least one input indicative of a combined current heat load of the first heat-producing device and the second heat-producing device, the control system being further configured to control the capacity of the cooling system based on an arbitration of a cooling capacity level based on the heat generation rate of the first heat-producing device, a cooling capacity level based on the heat generation rate of the second heat-producing device, and a cooling capacity level based on the at least one input indicative of the combined current heat load of the first heat-producing device and the second heat-producing device.

12. A thermal management system for a vehicle, comprising:
a cooling system including at least one of a fan, a pump, a valve, or a heat exchanger, and having a variable cooling capacity and connectable to a heat-producing system of the vehicle; and
a control system including at least one controller and configured to increase the cooling capacity of the cooling system to a first predetermined level based on a predicted increase in a future heat load of the heat-producing system when a temperature of the cooling system is at least a predetermined temperature and the cooling system is operating below the first predetermined level, and inhibit increasing the cooling capacity of the cooling system to the first predetermined level based on the predicted increase in the future heat load of the heat-producing system when the temperature of the cooling system is less than the predetermined temperature,
the control system being operable to control the cooling capacity of the cooling system in response to at least one input indicative of a current heat load of the heat-producing system, and control the capacity of the cooling system based on a maximum of a cooling capacity level based on at least one input indicative of a future heat load of the heat-producing system and a cooling capacity level based on the at least one input indicative of the current heat load of the heat-producing system.

13. The thermal management system of claim 12, wherein the heat-producing system includes a plurality of heat-producing devices, and the predicted increase in the future heat load of the heat-producing system is based on a predicted increase in a future heat load of at least two of the heat-producing devices to which the cooling system is connected.

14. The thermal management system of claim 13, wherein the control system is further configured to control the capacity of the cooling system based on an arbitration of a cooling capacity level based on the predicted increase in the future heat load of the at least two of the heat-producing devices and a cooling capacity level based on a current heat load of the at least two heat-producing devices.

15. The thermal management system of claim 14, wherein the control system is further configured to control the capacity of the cooling system based on an arbitration of a cooling capacity level based on a predicted decrease in the future heat load of the at least two of the heat-producing devices and a cooling capacity level based on the current heat load of the at least two heat-producing devices.

16. The thermal management system of claim 15, wherein the control system is further configured to decrease the cooling capacity of the cooling system when a result of the arbitration is to control the capacity of the cooling system based on the predicted decrease in the future heat load of the at least two of the heat-producing devices.

17. The thermal management system of claim 12, wherein the control system is further configured to increase the cooling capacity of the cooling system to a second predetermined level below the first predetermined level when the temperature of the cooling system is less than the predetermined temperature and the cooling system is operating below the second predetermined level.

18. The thermal management system of claim 17, wherein the control system is further configured to increase the cooling capacity of the cooling system from the second predetermined level to the first predetermined level when the temperature of the cooling system increases to the predetermined temperature and the cooling system is operating below the first predetermined level.

19. The thermal management system of claim 17, wherein the control system is further configured to increase the cooling capacity of the cooling system from the second predetermined level toward the first predetermined level when the temperature of the cooling system increases toward the predetermined temperature.

20. A thermal management system for a vehicle, comprising:
a cooling system including a cooling device having a variable cooling capacity and connectable to a heat-producing system of the vehicle; and
a control system including at least one controller and operable to control the cooling capacity of the cooling device in response to at least one input indicative of a future heat load of the heat-producing system, the control system being configured to increase the cooling capacity of the cooling device to a first predetermined level in response to the at least one input indicating an increase in the future heat load of the heat-producing system when a temperature of the cooling system is at least a predetermined temperature and the cooling device is operating below the first predetermined level, and to inhibit increasing the cooling capacity of the cooling device to the first predetermined level in response to the at least one input indicating an increase in the future heat load of the heat-producing system when the temperature of the cooling system is less than the predetermined temperature, including increasing the cooling capacity of the cooling device to a second predetermined level below the first predetermined level when the cooling device is operating below the second predetermined level.

21. The thermal management system of claim 20, wherein the cooling device is one of a fan, a pump, or a valve.

\* \* \* \* \*